(12) United States Patent
Khatri et al.

(10) Patent No.: US 11,853,803 B2
(45) Date of Patent: Dec. 26, 2023

(54) WORKLOAD COMPLIANCE GOVERNOR SYSTEM

(71) Applicant: Dell Products L.P., Round Rock, TX (US)

(72) Inventors: Mukund P. Khatri, Austin, TX (US); Gaurav Chawla, Austin, TX (US); William Price Dawkins, Lakeway, TX (US); Elie Jreij, Pflugerville, TX (US); Mark Steven Sanders, Fayetteville, AR (US); Walter A. O'Brien, III, Westborough, MA (US); Robert W. Hormuth, Cedar Park, TX (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/975,918

(22) Filed: Oct. 28, 2022

(65) Prior Publication Data
US 2023/0058909 A1 Feb. 23, 2023

Related U.S. Application Data

(63) Continuation of application No. 17/083,455, filed on Oct. 29, 2020, now Pat. No. 11,500,683.

(51) Int. Cl.
*G06F 9/50* (2006.01)

(52) U.S. Cl.
CPC ............ *G06F 9/5044* (2013.01); *G06F 9/505* (2013.01); *G06F 9/5083* (2013.01)

(58) Field of Classification Search
CPC ....... G06F 9/5044; G06F 9/505; G06F 9/5083
See application file for complete search history.

(56) References Cited

U.S. PATENT DOCUMENTS

| | | | |
|---|---|---|---|
| 2011/0153824 A1* | 6/2011 | Chikando | G06F 9/5088 718/100 |
| 2019/0121652 A1* | 4/2019 | Tayeb | G06F 9/44505 |
| 2019/0324769 A1* | 10/2019 | Ganesan | G06F 9/4408 |

* cited by examiner

*Primary Examiner* — Sisley N Kim
(74) *Attorney, Agent, or Firm* — Joseph Mencher

(57) ABSTRACT

A workload compliance governor system includes a management system coupled to a computing system. A workload compliance governor subsystem in the computing system receives a workload performance request associated with a workload, exchanges hardware compose communications with the management system to compose hardware components for the workload, and receives back an identification of hardware components. The workload compliance governor subsystem then determines that the identified hardware components satisfy hardware compliance requirements for the workload, and configures the identified hardware components in the computing system based on the software compliance requirements for the workload in order to cause those identified hardware components to provide an operating system and at least one application that operate to perform the workload.

20 Claims, 14 Drawing Sheets

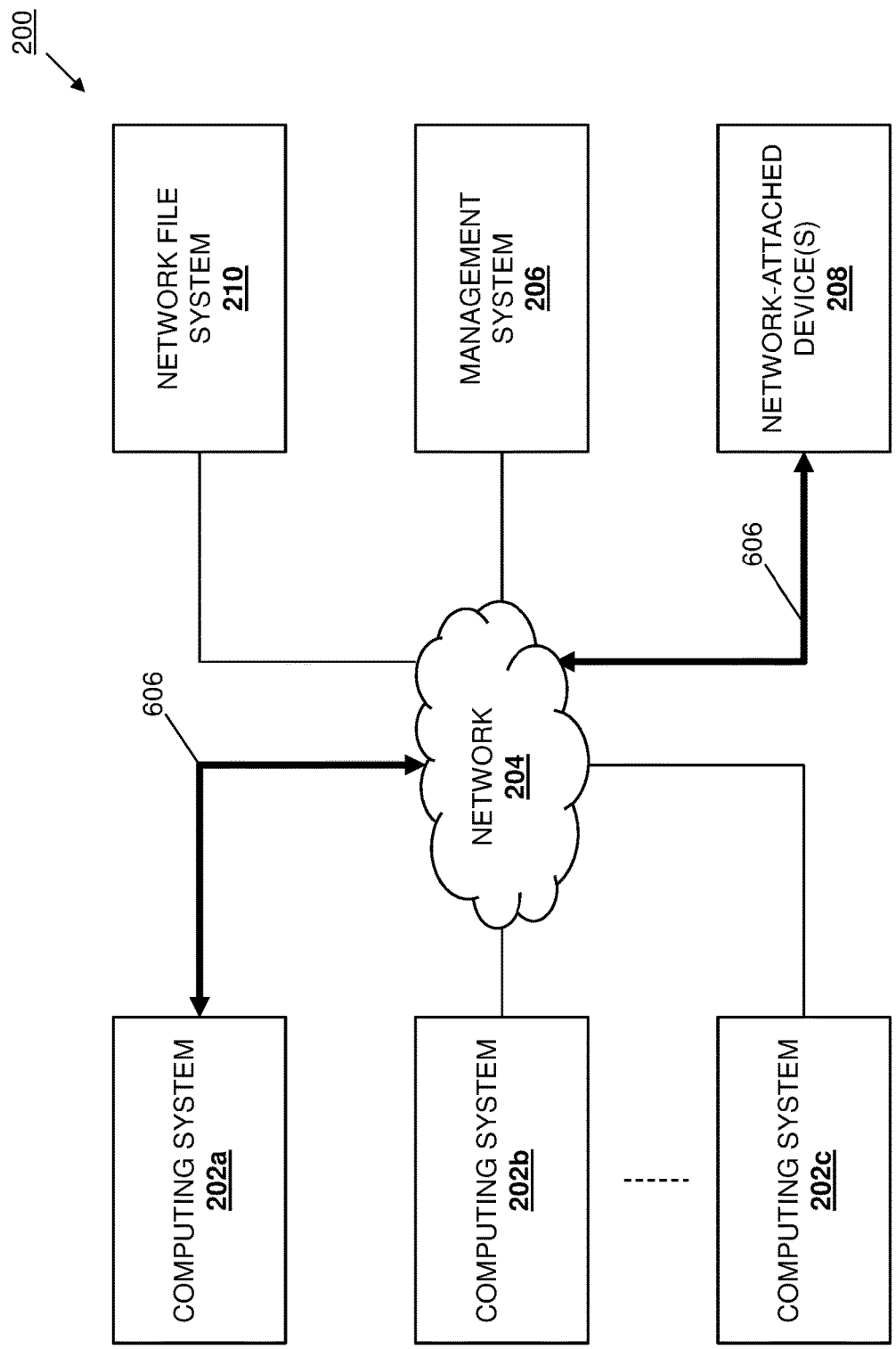

WORKLOAD COMPLIANCE GOVERNOR SYSTEM

CROSS-REFERENCE TO RELATED APPLICATIONS

The present disclosure is a continuation of U.S. patent application Ser. No. 17/083,455, filed Oct. 29, 2020, the disclosure of which is incorporated by reference herein in its entirety.

BACKGROUND

The present disclosure relates generally to information handling systems, and more particularly to governing workload compliance in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems known in the art may include disaggregated system architectures with components (e.g., processing/compute components, Input/Output (I/O) components, storage components, software components, etc.) that may be "composed" to perform workloads. As would be understood by one of skill in the art, the composing of components in a disaggregated system to perform a workload may include ensuring that those components (e.g., an operating system, applications, the platform, server devices, etc.) comply with any of a variety of workload requirements prior to performing the workload using those components. In conventional workload compliance systems, the assurance of the compliance of components in a disaggregated system for performing a workload is accomplished via "separate" compliance conformance assessments that are performed for each component (e.g., the operating system/application layer, the composed platform, various server device components, and/or other components), each of which may require a different operating environment (e.g., a diagnostics environment, a pre-boot environment, a runtime/operating system environment, etc.) in order to complete the compliance conformance assessment, which makes workload compliance assessments time consuming and complicated.

Accordingly, it would be desirable to provide a workload compliance governor system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a workload compliance governor engine that is configured to: receive a first workload performance request associated with a first workload including first hardware compliance requirements and first software compliance requirements; exchange, with a management system, first hardware compose communications to compose a plurality of hardware components for the first workload; receive, from the management system in response to the first hardware compose communications, an identification of a plurality of first hardware components; determine that the plurality of first hardware components satisfy the first hardware compliance requirements for the first workload; and configure the plurality of first hardware components in the computing system based on the first software compliance requirements for the first workload in order to cause the plurality of first hardware components to provide an operating system and at least one application that operate to perform the first workload.

BRIEF DESCRIPTION OF THE DRAWINGS

FIG. 6H is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
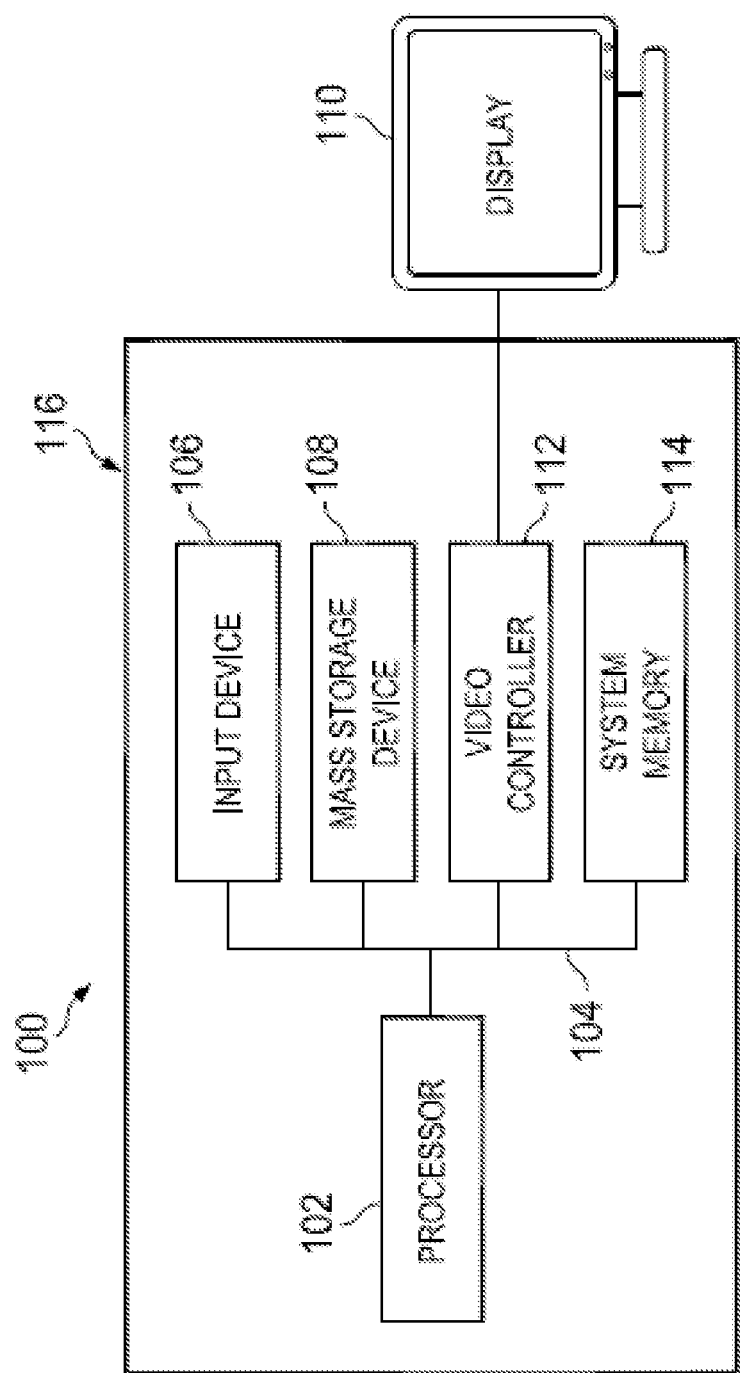
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
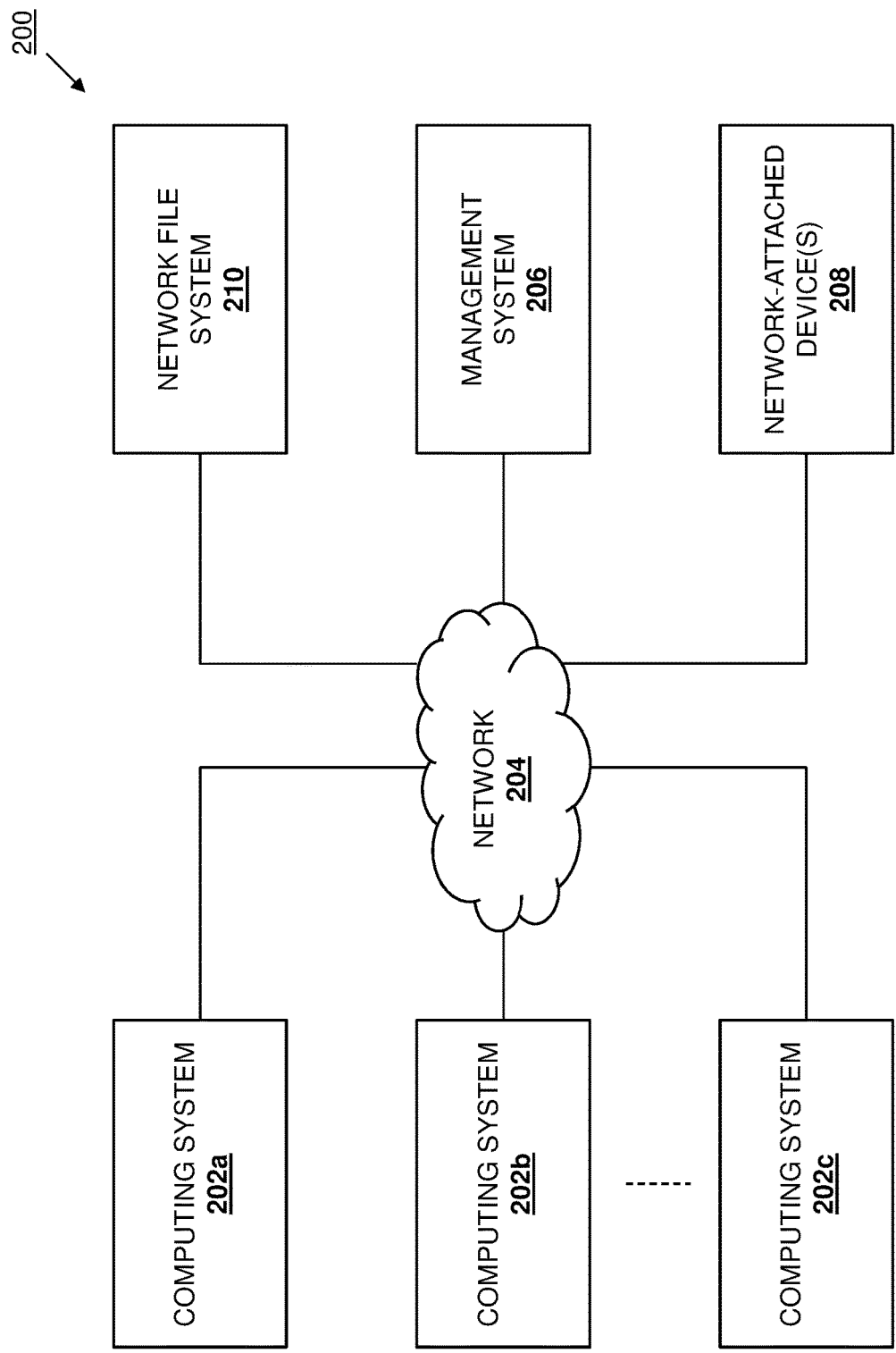
FIG. 2 is a schematic view illustrating an embodiment of a networked system.

Referring now to FIG. 2, an embodiment of a networked system 200 is illustrated in which the workload compliance governor system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c (e.g., an SCP manager for the SCP subsystems included in the computing systems 202a-202c discussed below, a workload orchestrator, etc.). In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples may be provided by one or more Non-Volatile Memory express (NVMe) storage devices that may be configured to provide a network-attached storage system for any or all of the computing systems 202a-202c.

In the illustrated embodiment, a network file system 210 is also coupled to the network 204. In an embodiment, the network file system 210 may be provided by one or more server devices that are configured to provide a client/server application that allows users of the networked system 200 to view, store, and/or update files on a remote computing system as through those files were located on that user's computing system, as well as provide a variety of other network file system functionality that would be apparent to one of skill in the art in possession of the present disclosure. However, while a specific networked system 200 has been illustrated and described, one of skill in the art in possession of the present disclosure will recognize that the workload compliance governor system of the present disclosure may be utilized with a variety of components and component configurations, and/or may be provided in a variety of computing system/network configurations, while remaining within the scope of the present disclosure as well.

Figure 3A:
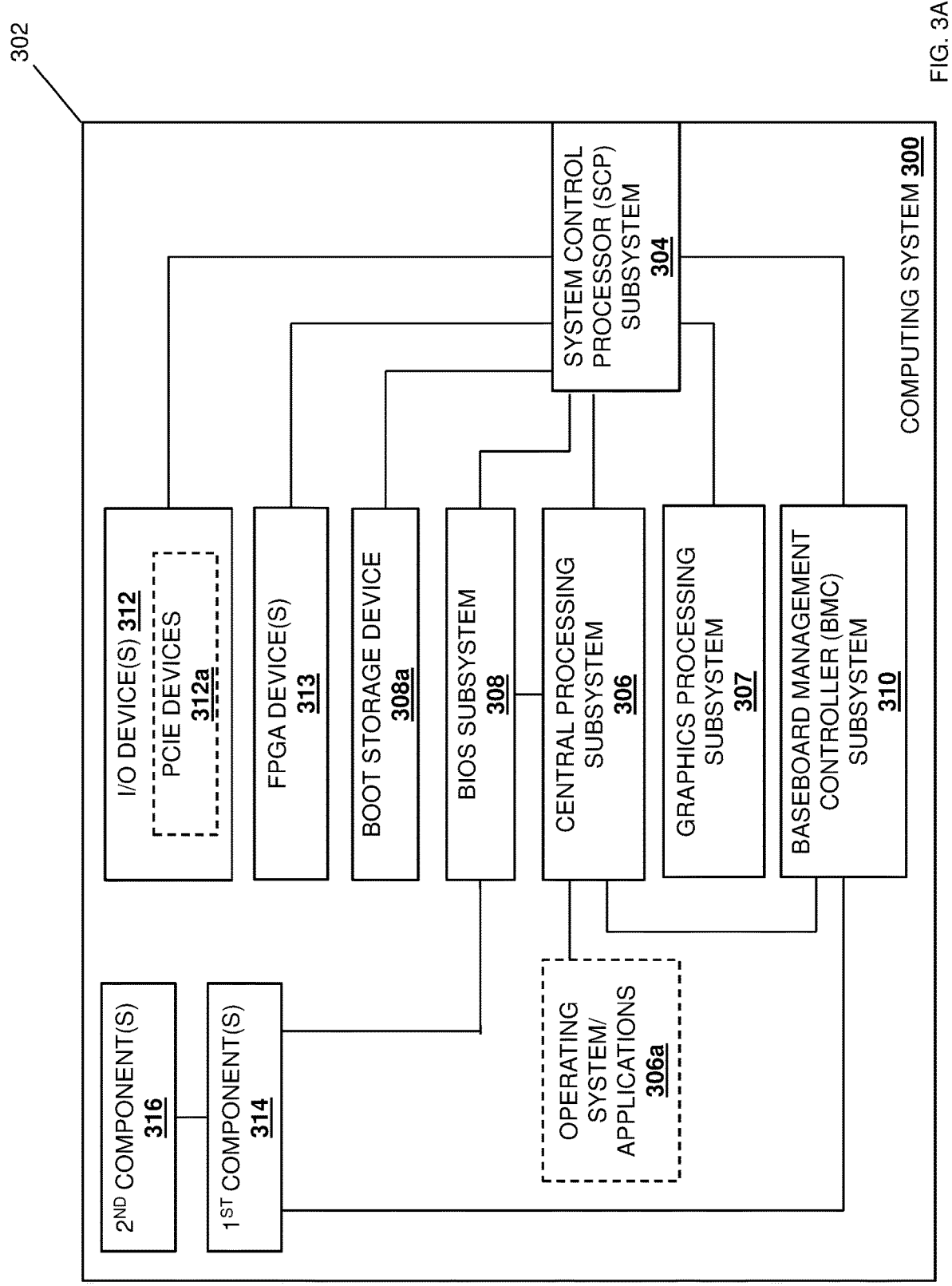
FIG. 3A is a schematic view illustrating an embodiment of a computing system that may be included in the networked system of FIG. 2 and that may utilize the workload compliance governor system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing system that are configured to operate similarly as the computing system 300 discussed below. In the illustrated embodiment, the computing system 300 includes a chassis 302 that houses the components of the computing system 300, only some of which are illustrated below.

In an embodiment, the chassis 302 may house a workload compliance governor subsystem that, in the examples illustrated and discussed above, is provided by a System Control Processor (SCP) subsystem 304 that operates according to the teachings of the present disclosure to perform the workload compliance governor functionality described herein. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, the disclosure of which is incorporated herein by reference in its entirety. However, while illustrated and described as an enhanced SmartNIC device provided by an SCP subsystem, one of skill in the art in possession of the present disclosure will appreciate that the SCP subsystem 304 may be replaced by a variety of other subsystems that are configured to perform the workload compliance governor functionality discussed below while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing subsystem 306 that is coupled to the SCP subsystem 304 (e.g., via a Compute Express Link (CxL)), and which may include the processor 102 discussed above with reference to FIG. 1, a Central Processing Unit (CPU) such as a x86 host processor, a CPU memory such as x86 host processor memory, and/or a variety of other processing components that would be apparent to one of skill in the art in possession of the present disclosure. In the examples provided below, the central processing subsystem 306 is configured to read instructions from a memory system (not illustrated) in the chassis 302 in order to provide the operating system and/or applications 306a discussed below, as well as any other software operations that would be apparent to one of skill in the art in possession of the present disclosure. The chassis 302 may also house a graphics processing subsystem 307 that is coupled to the SCP subsystem 304, and which may include the processor 102 discussed above with reference to FIG. 1, a Graphics Processing Unit (GPU), a GPU memory, and/or by a variety of other processing components that would be apparent to one of skill in the art in possession of the present disclosure. As will be appreciated by one of skill in the art in possession of the present disclosure, in the examples illustrated below, the graphics processing subsystem 307 connects to the central processing subsystem 306 via the SCP subsystem 304 such that the SCP subsystem 304 acts as a "host" for the graphics processing subsystem 307, although other central processing subsystem/graphics processing subsystem configurations will fall within the scope of the present disclosure as well.

The chassis 302 may also house a Basic Input/Output System (BIOS) subsystem 308 that is coupled to the SCP subsystem 304 and the central processing system 306, and that one of skill in the art in possession of the present disclosure will recognize as being provided by firmware that is configured to perform hardware initialization for the computing system 300 during a boot process (e.g., power-on startup operations) or other initialization processes known in the art, as well as runtime services for operating systems and/or other applications/programs provided by the computing system 300. Furthermore, while described as a BIOS subsystem, one of skill in the art in possession of the present disclosure will recognize that the BIOS subsystem 308 may be replaced with a Universal Extensible Firmware Interface (UEFI) subsystem, which one of skill in the art in possession of the present disclosure will recognize defines a software interface between an operating system and firmware in the computing system 300, and that was provided to replace BIOS subsystems (while supporting legacy BIOS services).

In the illustrated embodiment, the chassis 302 may also house a boot storage device 308a that is coupled to the SCP subsystem 304, and that one of skill in the art in possession of the present disclosure will recognize may store a boot image that may be accessible to and utilized by the BIOS subsystem 308 during boot operations. For example, the boot storage device 3080a may be provided by Boot Optimized Storage Solution (BOSS) available from DELL® Inc. of Round Rock, Texas, United States, although other boot storage devices will fall within the scope of the present disclosure as well. In the illustrated embodiment, the chassis 302 may also house a Baseboard Management Controller (BMC) subsystem 310 that is coupled to the SCP subsystem 304 and the central processing subsystem 306 (e.g., via a Peripheral Component Interconnect express (PCIe) link), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure.

The chassis 302 may also house (or provide a coupling for) one or more Input/Output (I/O) devices 312 that are coupled to the SCP subsystem 304. As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well. The chassis 302 may also house one or more Field Programmable Gate Array (FPGA) device (s) 313 that are coupled to the SCP subsystem 304, and that may be programmed to perform any of a variety of functions for the computing system 300 and/or the SCP subsystem 304.

Figure 3B:
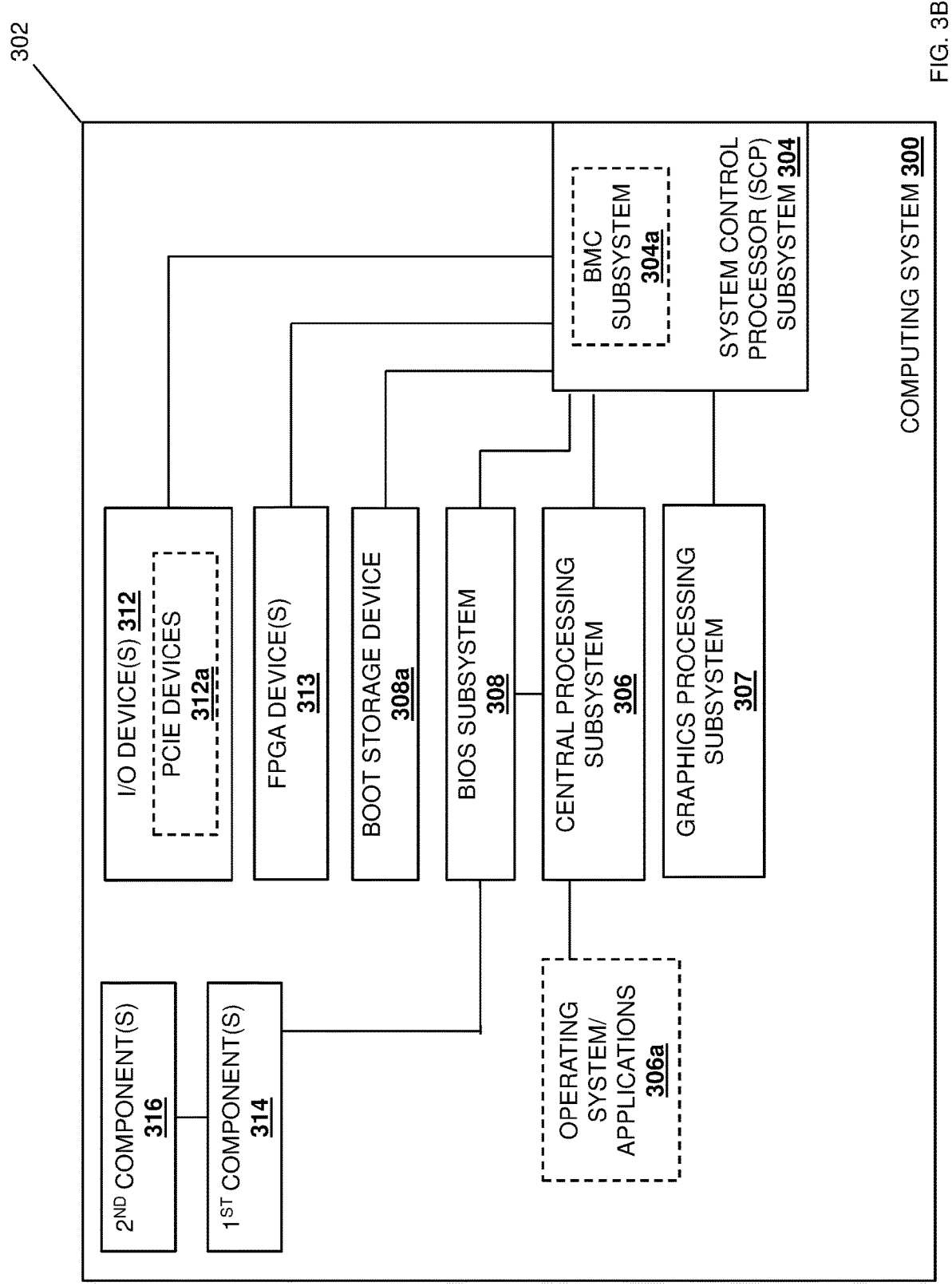
FIG. 3B is a schematic view illustrating an embodiment of a computing system that may be included in the networked system of FIG. 2 and that may utilize the workload compliance governor system of the present disclosure.

The chassis 302 may also house one or more first components 314 that are coupled to each of the BIOS subsystem 308 and the BMC subsystem 310, and one or more second components 316 that are coupled to at least one of the first components 314. In specific examples, the first component (s) 314 and the second component(s) 316 may include a Complex Programmable Logic Device (CPLD), a power system, and/or a variety of other computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured to provide a BMC subsystem 304a that performs the functionality of the BMC subsystem 310 in FIG. 3A.

Figure 4:
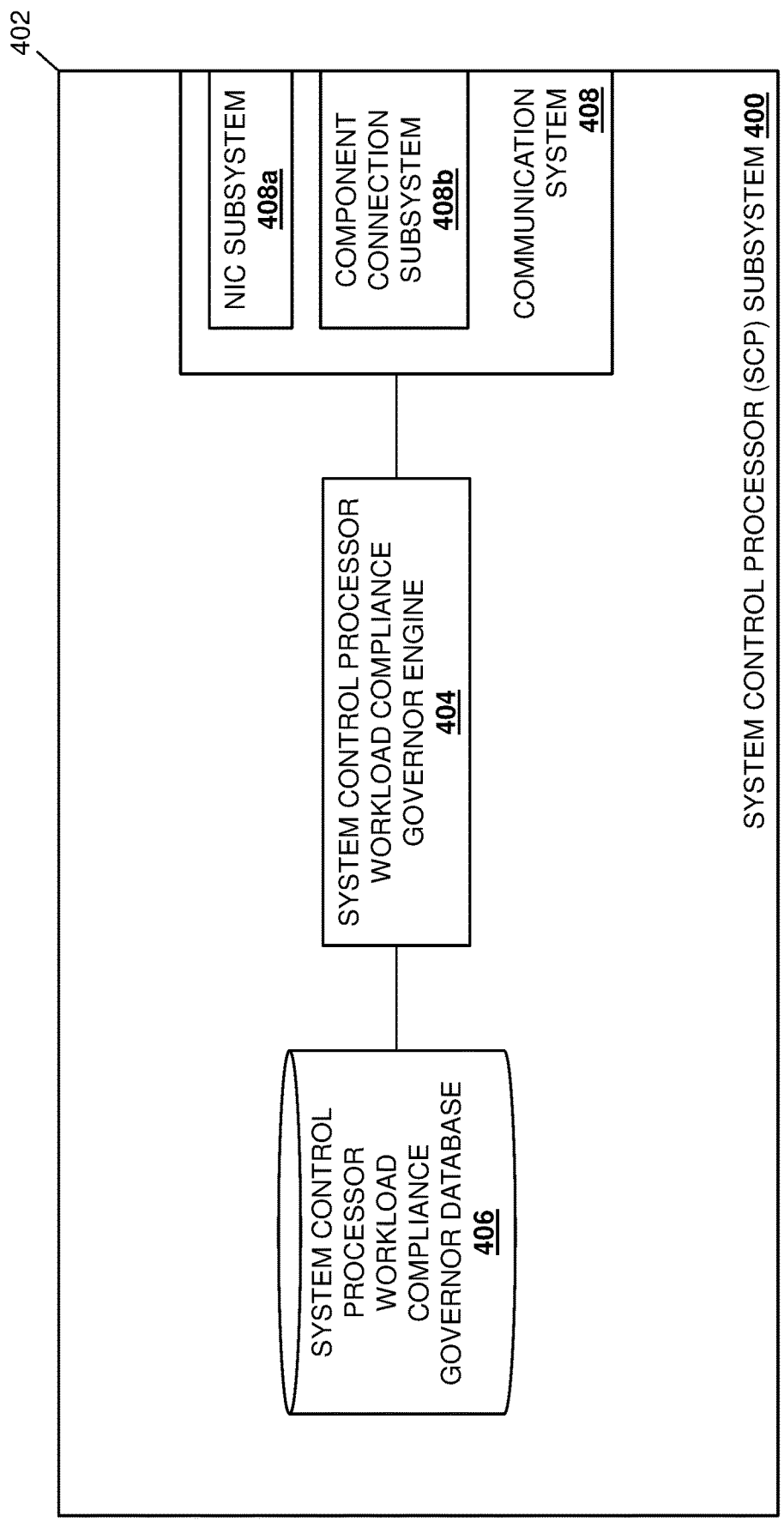
FIG. 4 is a schematic view illustrating an embodiment of an SCP subsystem that may be included in the computing device of FIG. 3A or 3B, and that may provide the workload compliance governor subsystem of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100, and in specific examples may be provided as an SCP card, may be integrated into a motherboard, or may be provided as a separate/co-motherboard circuit board. However, while illustrated and discussed as being provided in different manners in a computing system 400, one of skill in the art in possession of the present disclosure will recognize that the functionality of the SCP subsystem 400 discussed below may be provided by other devices that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support an SCP processing system including one or more SCP processors (not illustrated, but which may include the processor 102 discussed above with reference to FIG. 1) and an SCP memory system (not illustrated, but which may include the memory 114 discussed above with reference to FIG. 1) that is coupled to the SCP processing system and that includes instructions that, when executed by the SCP processing system, cause the SCP processing system to provide an SCP workload compliance governor engine 404 that is configured to perform the functionality of the SCP workload compliance governor engines and/or SCP subsystems discussed below. In a specific example, the SCP processing system providing the SCP workload compliance governor engine 404 may be provided by ARM processor cores in an ARM-based processor, although other processing systems will fall within the scope of the present disclosure as well.

The chassis 302 may also support a storage system (e.g., not illustrated, but which may include the storage 108 discussed above with reference to FIG. 1, the SCP memory system discussed above, etc.) that is coupled to the SCP workload compliance governor engine 404 (e.g., via a coupling between the storage system and the SCP processing system) and that may include one or more flash storage device(s), and one or more Storage Class Memory (SCM) storage devices, and/or other storage devices known in the art. However, while a few specific storage devices are illustrated and described below, one of skill in the art in possession of the present disclosure will appreciate that the storage system may include a variety of other storage devices that will fall within the scope of the present disclosure as well. As illustrated, the storage system may provide an SCP workload compliance governor database 406 that may store any information utilized by the SCP workload compliance governor engine 404 to perform the functionality discussed below.

The chassis 402 may also support a communication system 408 that is coupled to the SCP workload compliance governor engine 404 (e.g., via a coupling between the communication system 408 and the SCP processing system) and that, in the illustrated embodiment, includes a Network Interface Controller (NIC) subsystem 408a (e.g., an Ethernet subsystem) that is configured to connect the SCP subsystem 400 to the network 204 discussed above with reference to FIG. 2, a component connection subsystem 408b that is configured to couple the SCP subsystem 400 to any of the components included in and/or connected to the computing system 300 of FIGS. 3A and 3B, as well as any other communication components (e.g., wireless communication systems (e.g., BLUETOOTH®, Near Field Communication (NFC) components, WiFi components, etc.)) that would be apparent to one of skill in the art in possession of the present disclosure.

As such, the communication system 408 may include any of the connections between the SCP subsystem 400 and the network 204, the central processing subsystem 306, the graphics processing subsystem 307, the BIOS subsystem 308, the boot storage device 308a, the BMC subsystem 310, the I/O device(s) 312, the FPGA device(s) 313, and/or any other components utilized with the computing system 202a/300. For example, the component connection subsystem 408b may include a CxL Root .mem/.cache subsystem coupled to the central processing subsystem 306, and Out-Of-Band (OOB) management subsystem coupled to the BMC subsystem 310, and a CxL host subsystem coupled to the components in the computing system 300. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components (e.g., a local memory, embedded FPGA device(s), a Non-Volatile Memory express (NVMe) emulation subsystem between the SCP cloning engine 404 and the CxL Root .mem/.cache subsystem discussed above, etc.) and/or component configurations for providing the functionality discussed below while remaining within the scope of the present disclosure as well.

Figure 5:
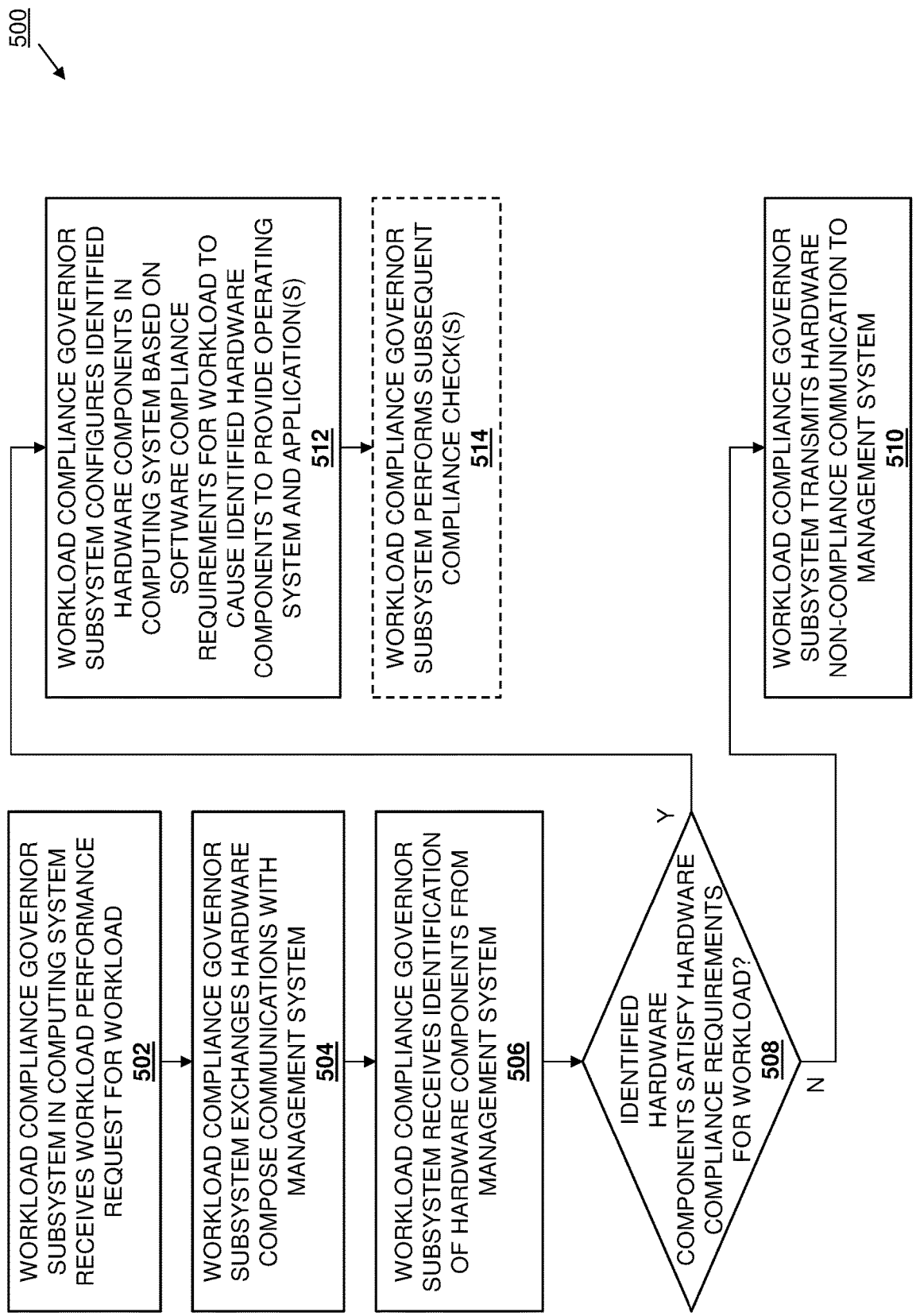
FIG. 5 is a flow chart illustrating an embodiment of a method for governing workload compliance in a computing system.

Referring now to FIG. 5, an embodiment of a method 500 is illustrated for governing workload compliance of an information handling system. As discussed below, the systems and methods of the present disclosure provide distributed, immutable, workload compliance governance that is local to each computing system, thus ensuring workload compliance at the edge of networks, unified/consolidated workload compliance for all interfaces, and the ability to dynamically address workload compliance issues in real-time. For example, the workload compliance governor system of the present disclosure may include a management system coupled to a computing system. A workload compliance governor subsystem in the computing system receives a workload performance request associated with a workload, exchanges hardware compose communications with the management system to compose hardware components for the workload, and receives back an identification of hardware components. The workload compliance governor subsystem then determines that the identified hardware components satisfy hardware compliance requirements for the workload, and configures the identified hardware components in the computing system based on the software compliance requirements for the workload in order to cause those identified hardware components to provide an operating system and at least one application that operate to perform the workload. As such, the "separate" compliance conformance assessments that are required in conventional workload compliance systems for each component performing a workload are eliminated, making workload compliance assessments relatively quicker and less complicated.

Figure 6A:
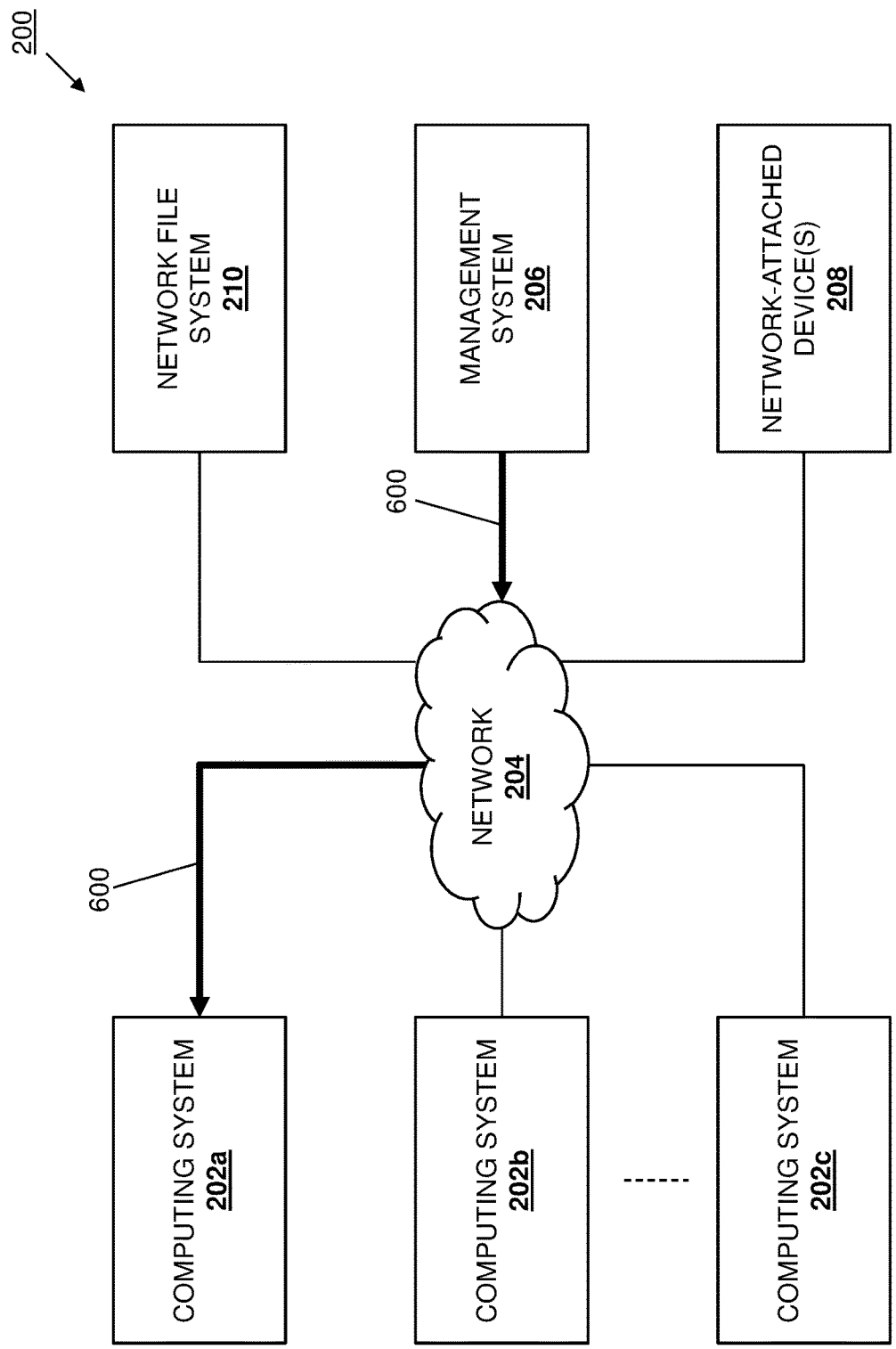
FIG. 6A is a schematic view illustrating an embodiment of the networked system of FIG. 2 operating during the method of FIG. 5.
Figure 6B:
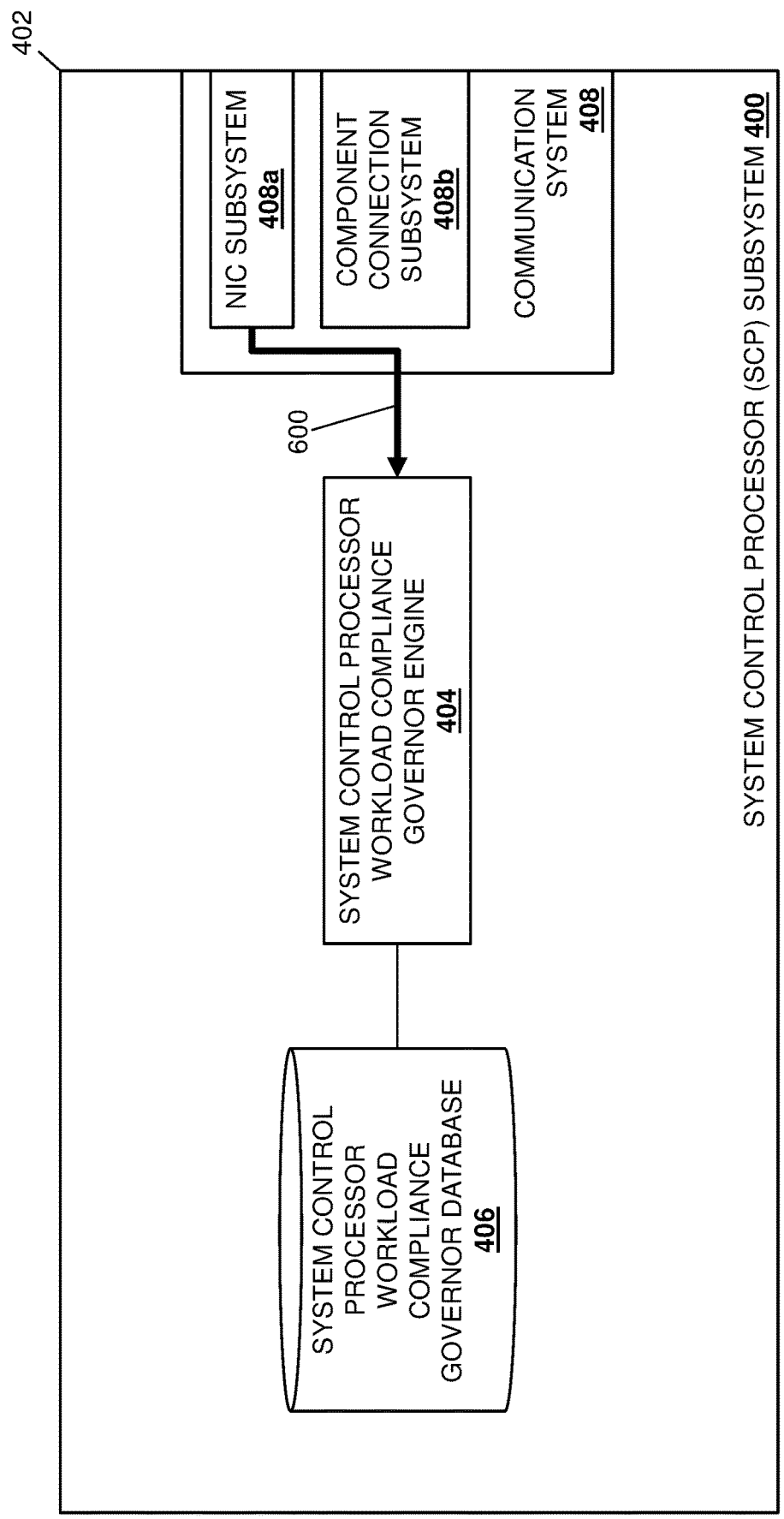
FIG. 6B is a schematic view illustrating an embodiment of the SCP subsystem of FIG. 4 operating during the method of FIG. 5.

The method 500 begins at block 502 where a workload compliance governor subsystem in a computing system receives a workload performance request for a workload. With reference to FIGS. 6A and 6B, in an embodiment of block 502, the management system 206 may perform workload performance request operations 600 that may include generating and transmitting a workload performance request via the network 204 and to the computing system 202a/300 such that the SCP workload compliance governor engine 404 in the SCP subsystem 304/400 in the computing system 202a/300 receives that workload performance request via the NIC subsystem 408a in its communication system 408. As discussed above, in some embodiments, the management system 206 may include an SCP manager that is configured to generate and transmit workload performance requests, but one of skill in the art in possession of the present disclosure will recognize that the workload performance request received by the SCP subsystem 204/400 in the computing system 202a/300 at block 502 may be generated and transmitted by other entities (e.g., entities included in the management system 206, entities separate from the management system 206 and connected to the network 204, etc.) while remaining within the scope of the present disclosure as well.

In the examples below, the workload associated with the workload performance request is described as being provided on the computing system 202a/300. However, one of skill in the art in possession of the present disclosure will appreciate that workloads may be distributed across and/or otherwise provided by multiple computing systems (e.g., any combination and/or all of the computing systems 202a-202c), and thus the workload described as being provided on the computing system 202a/300 below may be one of multiple sub-workloads that are performed by the computing systems 202a, 202b, and/or up to 202c to provide a workload while remaining within the scope of the present disclosure as well.

In some embodiments, the workload performance request may include hardware compliance requirements associated with the workload whose performance is being requested, software compliance requirements associated with the workload whose performance is being requested, and/or any other workload requirements that would be appreciated by one of skill in the art in possession of the present disclosure. In some examples, the workload performance request may include a workload compliance checklist that identifies the workload requirements for that workload. However, in other examples, the SCP workload compliance governor engine 404 in the SCP subsystem 304/400 in the computing system 202a/400 may retrieve any workload requirements for the workload (e.g., from the SCP manager and/or other entity in the management system 206, from an entity that is separate from the management system 206, etc.) in response to receiving the workload performance request that requests the performance of that workload. Furthermore, one of skill in the art in possession of the present disclosure will recognize that workload requirements for a workload may be received, retrieved, and/or otherwise identified (e.g., in a network-attached storage system provided by the network-attached device(s) 208) in a variety of manners while remaining within the scope of the present disclosure as well.

In some examples, hardware requirements for a workload may include processing subsystem requirements that identify any details about processing subsystems (e.g., central processing subsystems, graphics processing subsystems, etc.) that should be utilized to provide the workload, BIOS subsystem requirements that identify any details about BIOS subsystems that should be utilized to provide the workload, boot storage device requirements that identify any details about boot storage devices that should be utilized to provide the workload, FPGA device requirements that identify any details about FPGA devices that should be utilized to provide the workload, I/O devices requirements that identify any details about I/O devices that should be utilized to provide the workload, and/or any other hardware requirements that would be apparent to one of skill in the art in possession of the present disclosure. Furthermore, the hardware requirements for a workload may include hardware configuration requirements that identify any details about the configuration of hardware components that should be utilized to provide the workload.

In a specific example, the hardware requirements for a workload may identify the type and/or number of processing cores that should be utilized to provide the workload, the type and/or amount of memory that should be utilized to provide the workload, the type and/or amount of storage that should be utilized to provide the workload, a requirement that the workload be provided according to Federal Information Processing Standards (FIPS), a requirement that the workload should be provided using a Trusted Platform Module (TPM), a requirement that the workload should be provided using Secure Encrypted Drives (SEDs), a requirement that the workload should be provided with a maximum amount of latency, a requirement that the workload should be provided with a maximum amount of throttling, Service Level Agreement (SLA) requirements that detail the service level at which the workload should be provided, and/or any of a variety of other specific hardware requirements that would be apparent to one of skill in the art in possession of the present disclosure. As will be appreciated by one of skill in the art in possession of the present disclosure, the number of possible hardware requirements for a workload are numerous and thus are not all listed herein, but are envisioned as falling within the scope of the present disclosure.

In some examples, software requirements for a workload may include firmware requirements that identify any details about firmware that should be utilized with hardware to provide the workload, operating system requirements that identify any details about operating systems that should be utilized to provide the workload, application requirements that identify any details about applications (e.g., hypervisor applications) that should be utilized to provide the workload, settings requirements that identify any details about settings (e.g., BIOS settings, BMC settings, NIC settings) that should be utilized to provide the workload, policy requirements that identify any details about policies (e.g., firewall policies, storage key management policies, etc.) that should be utilized to provide the workload, telemetry requirements that detail how telemetry data should be captured when providing the workload, and/or any other software requirements that would be apparent to one of skill in the art in possession of the present disclosure.

Figure 6C:
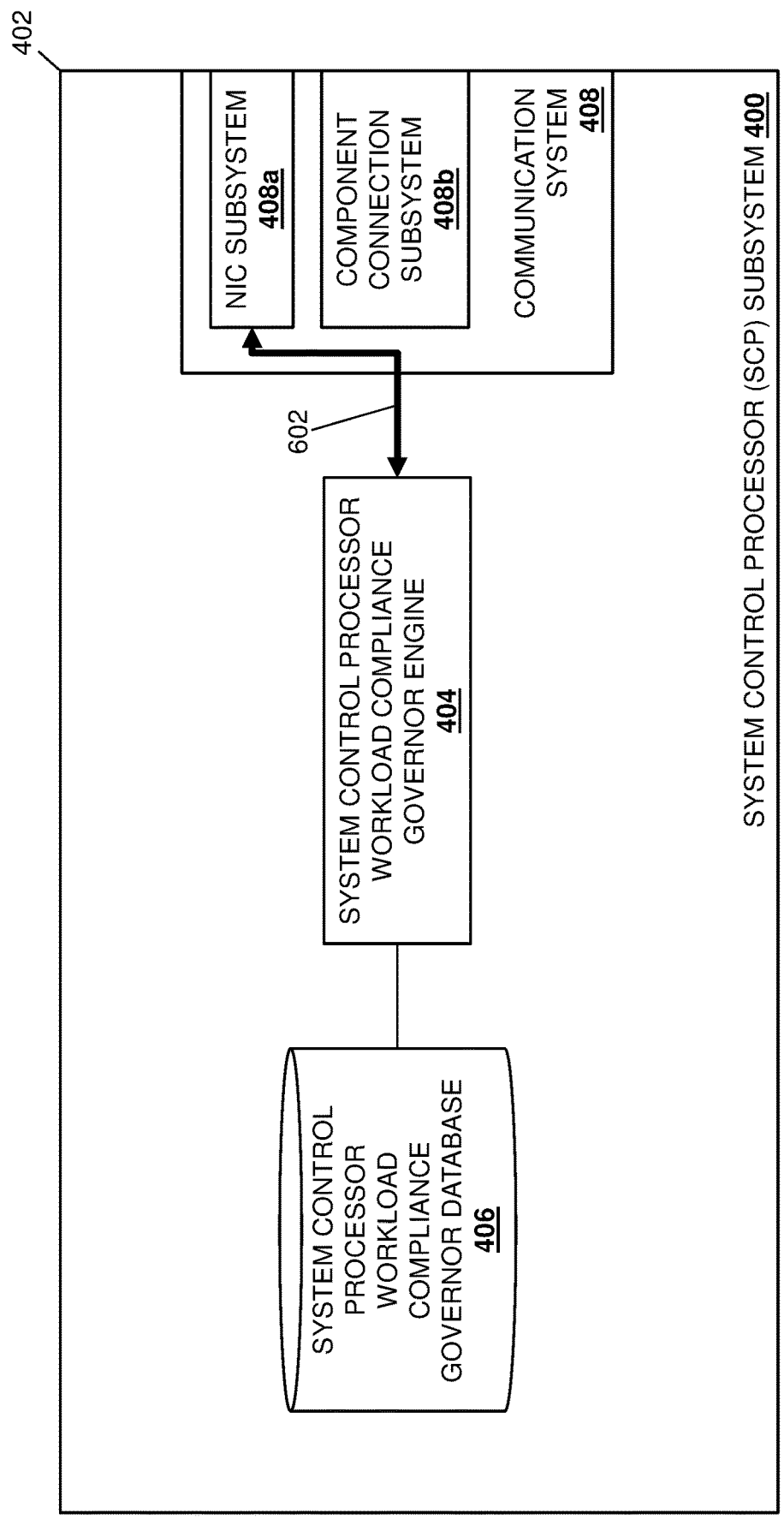
FIG. 6C is a schematic view illustrating an embodiment of the SCP subsystem of FIG. 4 operating during the method of FIG. 5.
Figure 6D:
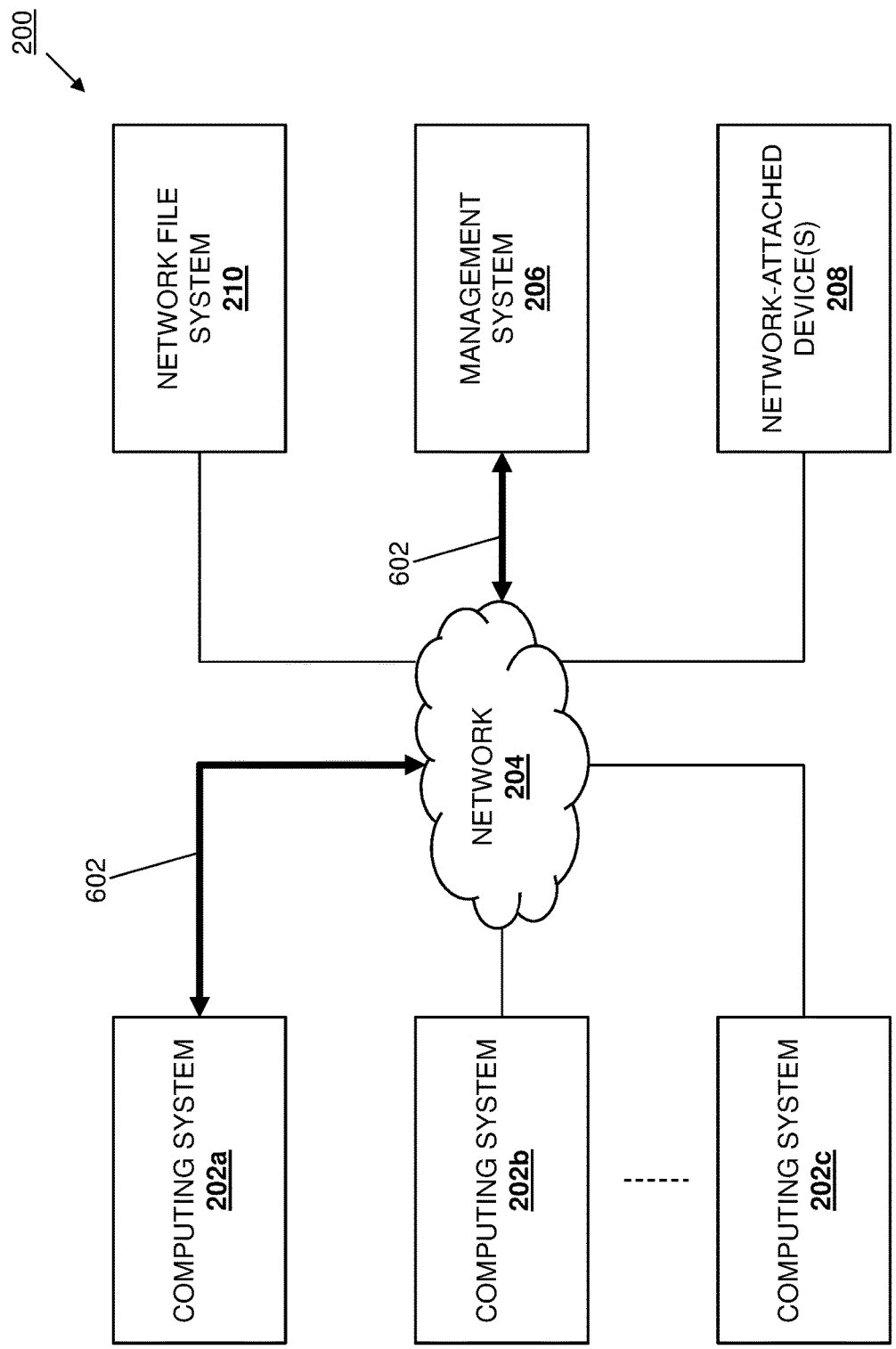
FIG. 6D is a schematic view illustrating an embodiment of the networked system of FIG. 2 operating during the method of FIG. 5.

In a specific example, the software requirements for a workload may identify that the workload should be provided with particular secure boot settings, a TPM, an Active Directory, according to a FIPS mode, with particular firewall policies, with particular storage key management policies, along with the capture of particular telemetry data, and/or any of a variety of other specific software requirements that would be apparent to one of skill in the art in possession of the present disclosure. As will be appreciated by one of skill in the art in possession of the present disclosure, the number of possible software requirements for a workload are numerous and thus are not all listed herein, but are envisioned as falling within the scope of the present disclosure The method 500 then proceeds to block 504 where the workload compliance governor subsystem exchanges hardware compose communications with a management system. With reference to FIGS. 6C and 6D, in an embodiment of block 504, the SCP workload compliance governor engine 404 in the SCP subsystem 304/400 in the computing system 202a/300 may perform hardware compose communication operations 602 that include generating and transmitting hardware compose communications via the NIC system 408a in its communication system 408 and through the network 204 to the management system 206, receiving hardware compose communications through the network and via the NIC system 408a in its communication system 408 from the management system 206, and/or otherwise exchanging hardware compose communications with the management system 206 in any of a variety of manners that would be understood by one of skill in the art in possession of the present disclosure. As discussed above, the management system 206 may include an SCP manager that operates to manage SCP subsystems in each of the computing systems 202a-202c, and in the examples below that SCP manager operates to exchange the hardware compose communications with the SCP subsystem 304 in the computing system 202a/300 (as well as SCP subsystems in other computing systems). However, one of skill in the art in possession of the present disclosure will appreciate that other entities may perform the hardware compose functionality described herein as being performed by the SCP manager while remaining within the scope of the present disclosure as well.

In some embodiments of block 504, in response to receiving the workload performance request at block 502, the SCP workload compliance governor engine 404 in the SCP subsystem 304/400 in the computing system 202a/300 may generate and transmit a first hardware compose communication that identifies requested hardware and/or hardware configurations for use in performing the workload requested by that workload performance request. For example, the first hardware compose communication may request particular processing subsystem(s) (e.g., a GPU), particular memory subsystems (e.g., a type and amount of memory), particular storage subsystems (e.g., a type and amount of storage), FIPS-enabled hardware, a TPM, SEDs, less than a maximum amount of latency, less than a maximum amount of throttling, SLA information, and/or any other hardware details that would be apparent to one of skill in the art in possession of the present disclosure.

As will be appreciated by one of skill in the art in possession of the present disclosure, the SCP manager in the management system 206 may have a global view of the hardware that is available in the network system 200 and accessible to the SCP subsystem 304 and/or the computing system 202a/300, and thus may receive the first hardware compose communication from the SCP subsystem 304 in the computing system 202a/300 and determine hardware components that conform (or attempt to conform) to the hardware and/or hardware configurations requested in the first hardware compose communication. As such, at block 504 the SCP manager in the management system 206 may determine whether hardware components requested in the first hardware compose communication are available in the computing system 202a/300, in the computing systems 202b and/or 202c, and/or the network-attached device(s) 208, and are accessible to the SCP subsystem 304 in the computing system 202a/300.

Furthermore, at block 504 the SCP manager in the management system 206 may also make the determination of the availability and/or accessibility of hardware components requested in the first hardware compose communication based on SCP subsystem/computing system compliance requirements for the networked system 200. For example, one of skill in the art in possession of the present disclosure will recognize that SCP subsystems (e.g., SCP "clusters") may include SCP cluster compliance requirements such as, for example, latency requirements, throughput requirements, multi-tenancy requirements, and/or other SCP cluster requirements known in the art (e.g., SCP cluster requirements that may be configured by a network administrator or other use of the networked system 200 to ensure a minimum level of operation of the SCP subsystems/computing systems). As such, one of skill in the art in possession of the present disclosure will recognize how the determination of the availability and/or accessibility of hardware components requested in the first hardware compose communication may include the consideration of compliance requirements for the SCP subsystems 304 in the computing systems 202a-202c/300 as well.

The method 500 then proceeds to block 506 where the workload compliance governor subsystem receives an identification of hardware components. In an embodiment, at block 506 and as part of the hardware compose communication operations 602, the SCP manager in the management system 206 may generate and transmit second hardware compose communications through the network 204. For example, the second hardware compose communication may identify particular processing subsystem(s), particular memory subsystems, particular storage subsystems, FIPS-enabled hardware, a TPM, SEDs, a maximum amount of latency, a maximum amount of throttling, SLA information, and/or any other hardware component details of hardware components that were identified by the SCP manager in the management system 206 at block 504. Thus, at block 506, the SCP workload compliance engine 404 in the SCP subsystem 304/400 in the computing system 202a/300 may receive the second hardware compose communications via the NIC subsystem 408a in its communication system 408.

The method 500 then proceeds to decision block 508 where it is determined whether the identified hardware components satisfy the hardware compliance requirements for the workload. In an embodiment, at decision block 508 and in response to receiving the identification of hardware components from the SCP manager in the management system 206, the SCP workload compliance engine 404 in the SCP subsystem 304/400 in the computing system 202a/300 may determine whether those identified hardware components satisfy the hardware compliance requirements of the workload for which the workload performance request as received at block 502. As will be appreciated by one of skill in the art in possession of the present disclosure, the SCP workload compliance engine 404 in the SCP subsystem 304/400 in the computing system 202a/300 may compare the hardware components identified by the SCP manager in the management system 206 to the hardware compliance requirements for the workload to determine whether those identified hardware components satisfy those hardware compliance requirements.

While not illustrated in FIG. 5, one of skill in the art in possession of the present disclosure will recognize that the hardware compose communication operations 602 may include the iterative exchange of hardware compose communications between the SCP subsystem 304 in the computing system 202a/300 and the SCP manager in the management system 206 to identify first hardware components, determine whether those identified first hardware components satisfy hardware compliance requirements for a workload and, if not, identify second hardware components, determine whether those identified second hardware components satisfy hardware compliance requirements for the workload, and so on until it is either determined at decision block 508 that the hardware compliance requirements for the workload are satisfied by the hardware components identified by the SCP manager in the management system 206, or that the hardware compliance requirements for the workload are not satisfied by the hardware components identified by the SCP manager in the management system 206. Thus, to provide a specific example, the SCP subsystem 304 in the computing system 202a/300 may request a first GPU for use in providing the workload, the SCP manager in the management system 206 may identify a second GPU, the SCP subsystem 304 in the computing system 202a/300 may determine that the second GPU does not satisfy the hardware compliance requirements for the workload and then request a third GPU for use in providing the workload, as so on until a GPU is identified that satisfies the hardware compliance requirements for the workload, or no GPU can been identified that satisfies the hardware compliance requirements for the workload.

Figure 6E:
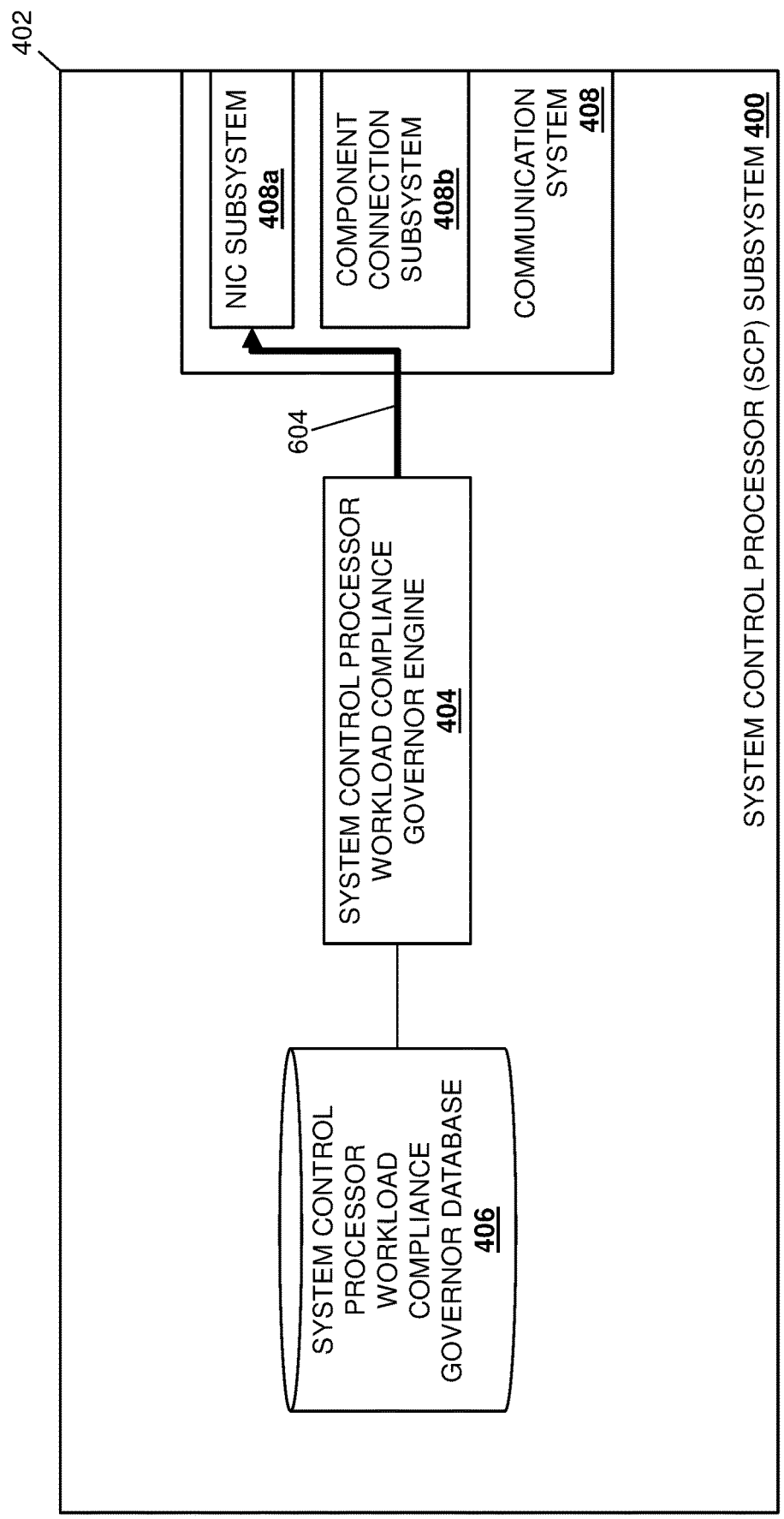
FIG. 6E is a schematic view illustrating an embodiment of the SCP subsystem of FIG. 4 operating during the method of FIG. 5.
Figure 6F:
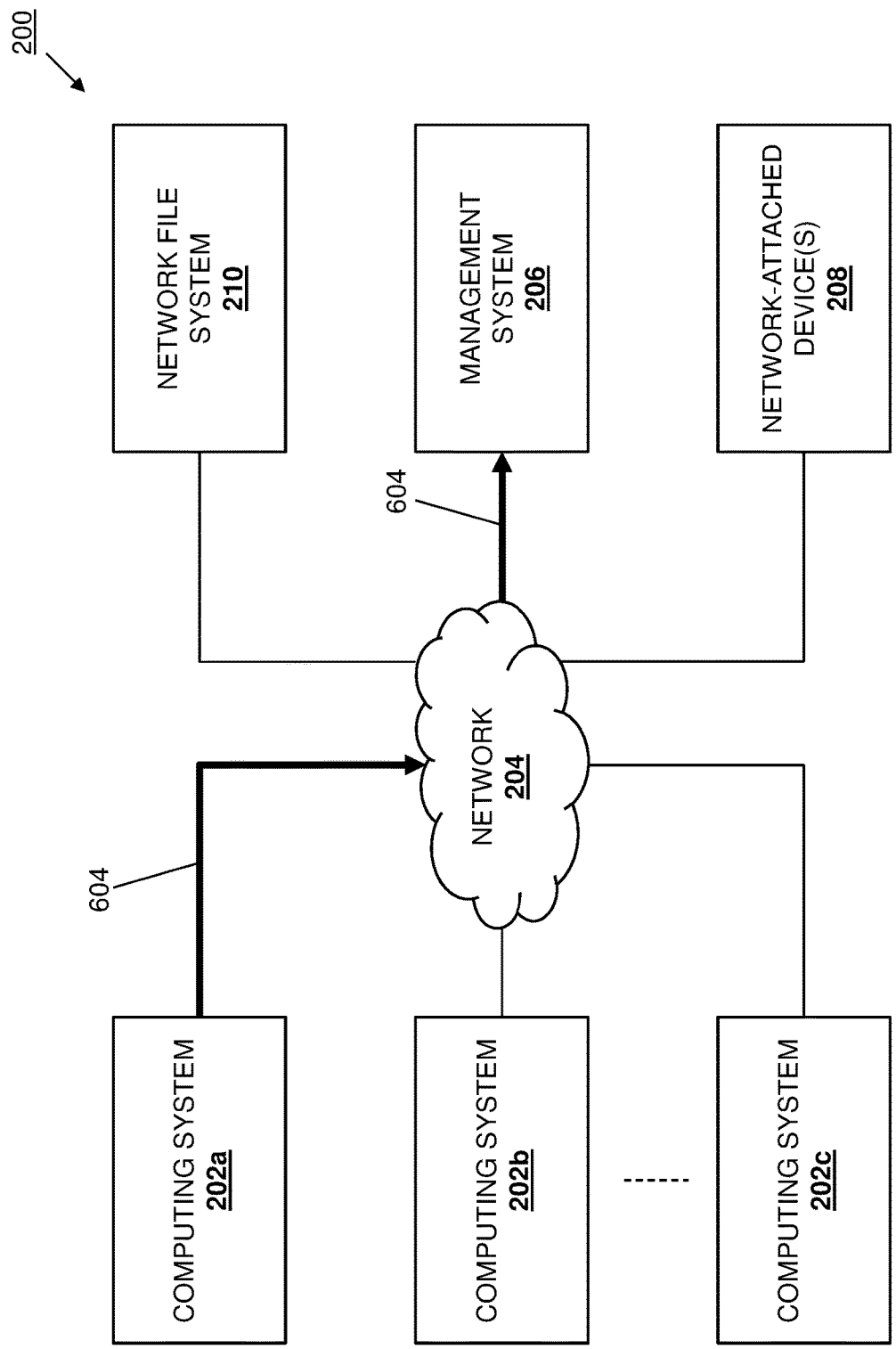
FIG. 6F is a schematic view illustrating an embodiment of the networked system of FIG. 2 operating during the method of FIG. 5.

If, at decision block 508, it is determined that the identified hardware components are not available in the computing system, the method 500 proceeds to block 510 where the workload compliance governor subsystem transmits a hardware non-compliance communication to the management system. With reference to FIGS. 6E and 6F, in an embodiment of block 510 and in response to determining that hardware component(s) identified by the SCP manager in the management system 206 do not satisfy the hardware compliance requirements of the workload for which the workload performance request as received at block 502, the SCP workload compliance engine 404 in the SCP subsystem 304/400 in the computing system 202a/300 may perform hardware non-compliance communication operations 604 that include generating and transmitting hardware non-compliance communications via the NIC subsystem 408a in its communication system 408 and through the network 204 to the management system 206.

As discussed above, in some embodiments, the SCP manager in the management system 206 may have transmitted the workload performance request at block 502, and thus the SCP workload compliance engine 404 in the SCP subsystem 304/400 in the computing system 202a/300 may transmit the hardware non-compliance communications to the SCP manager in the management system 206 at block 510. However, as also discussed above, one of skill in the art in possession of the present disclosure will recognize that the workload performance request received at block 502 may be generated and transmitted by other entities (e.g., an entity included in the management system 206, an entity separate from the management system 206 and connected to the network 204, etc.), and thus the SCP workload compliance engine 404 in the SCP subsystem 304/400 in the computing system 202a/300 may transmit the hardware non-compliance communications to that entity at block 510 while remaining within the scope of the present disclosure as well. As will be appreciated by one of skill in the art in possession of the present disclosure, the hardware non-compliance communications may include any information that indicates that the hardware components available to and/or accessible by the SCP subsystem 304 and/or the computing system 202a/300 do not satisfy the hardware compliance requirements for the workload for which the workload performance request was received at block 502.

In some embodiments, the transmission of the hardware non-compliance communications may be followed by the SCP manager in the management system 206 operating to determine another SCP subsystem/computing system upon which to provide the workload associated with the workload performance request transmitted at block 502. For example, following the transmission of the hardware non-compliance communications at block 510, the SCP workload compliance engine 404 in the SCP subsystem 304/400 in the computing system 202a/300 and/or the SCP manager in the management system 206 may operate to provide that workload (or a portion of that workload) on another computing system (i.e., a computing system with available/accessible hardware components that satisfy all of the hardware compliance requirements of that workload, a computing system with available/accessible hardware components that satisfy the hardware compliance requirements of a portion of that workload that were not satisfied by the computing system 202a, etc.) As such, a workload initially requested to be performed by a first computing system may subsequently be performed by one or more second computing systems, or a combination of the first computing system and one or more second computing systems.

Figure 6G:
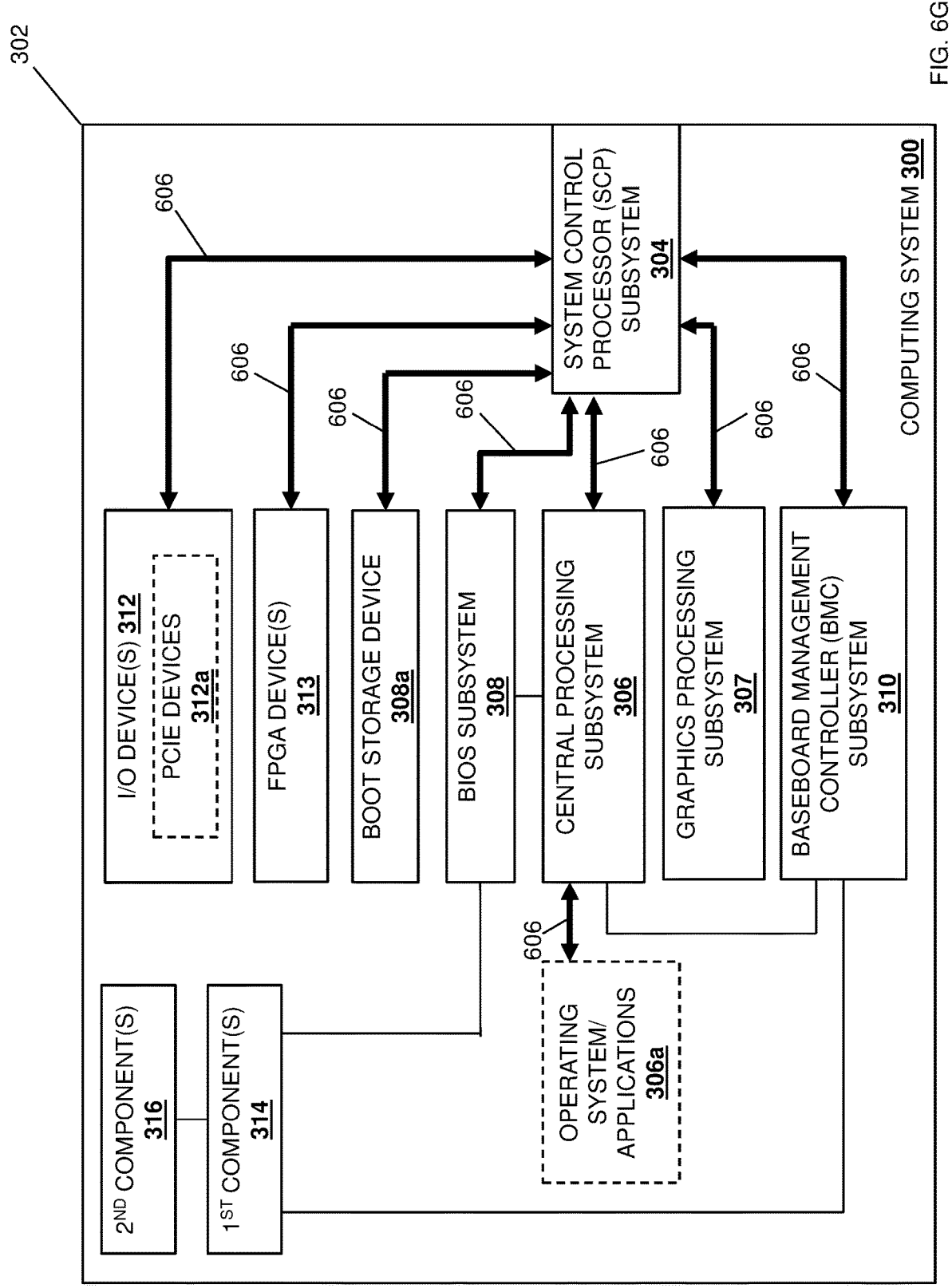
FIG. 6G is a schematic view illustrating an embodiment of the computing system of FIG. 3A operating during the method of FIG. 5.

If, at decision block 508, it is determined that the identified hardware components are available in the computing system, the method 500 proceeds to block 512 where the workload compliance governor subsystem configures the identified hardware components in the computing system based on software compliance requirements for the workload to cause the identified hardware components to provide an operating system and one or more applications. With reference to FIGS. 6G and 6H, in an embodiment of block 512 and in response to determining that the hardware components identified by the SCP manager in the management system 206 satisfy the hardware compliance requirements of the workload, the SCP workload compliance governor engine 404 in the SCP subsystem 304/400 in the computing system 202a/300 may perform hardware configuration operations 606 to configure those hardware components based on the software requirements of the workload.

As such, the hardware configuration operations 606 may include the SCP workload compliance governor engine 404 in the SCP subsystem 304/400 in the computing system 202a/300 configuring (via the component connections 408b in the communication system 408) the central processing subsystem 306, the operating system and/or applications 306a, the graphics processing subsystem 307, the BIOS subsystem 308, the boot storage device 308a, the BMC subsystem 310, the I/O device(s) 312, the FPGA device(s) 313, and/or any other hardware components identified in the computing system 202a/300. Furthermore, the hardware configuration operations 606 may also include the SCP workload compliance governor engine 404 in the SCP subsystem 304/400 in the computing system 202a/300 configuring (via the NIC subsystem 408a in the communication system 408 and through the network 204) the network-attached device(s) 208 and/or any other hardware components identified outside the computing system 202a/300.

For example, the hardware configuration operations 606 may include configuring firmware for any of the hardware components identified to provide the workload, configuring the operating system 306a used to provide the workload, configuring the application(s) 306a (e.g., a hypervisor application) used to provide the workload, configuring any settings (e.g., BIOS settings, BMC settings, NIC settings) for hardware that is used to provide the workload, configuring any policy used to provide the workload, configuring how telemetry data will be captured when providing the workload, and/or performing any other software configurations that would be apparent to one of skill in the art in possession of the present disclosure. In a specific example, the hardware configuration operations 606 may include the configuration of particular secure boot settings, a TPM, an Active Directory, a FIPs mode, particular firewall policies, particular storage key management policies, and/or any of a variety of other specific software configurations that would be apparent to one of skill in the art in possession of the present disclosure.

Subsequent to performing the hardware configurations at block 512, the computing system 202a/300 may provide the workload using the hardware components configured with the software discussed above to provide the operating system and/or application(s) 306a, with the operating system and/or applications operating to perform any of a variety of workload operations defined by the workload. As such, the computing system 202a/300 may operate to provide the workload by itself, or may operate to provide a sub-workload that, along with other sub-workloads provided by the other computing systems 202b and up to 202c, provide a workload. Furthermore, one of skill in the art in possession of the present disclosure will appreciate that the computing system 202a/300 may operate to provide that workload as long as needed, and additional workloads (or sub-workloads) may be provided by the computing system 202a/300 using other hardware components that are available/accessible to the computing system 202a/300 (e.g., hardware components that are not being used to provide any other workloads.) Thus, compliance of the operating system, applications, platform, and other hardware/software components in the computing system 202a/300 with workload requirements for a workload may be assessed and confirmed from a local, consolidated compliance governance control point in that computing system 202a/300 before providing that workload using that computing system 202a/300

The method 500 then proceeds to optional block 514 where the workload compliance governor subsystem may perform subsequent compliance checks. In an embodiment, at block 514, the SCP workload compliance governor engine 404 in the SCP system 304/400 in the computing system 202a/300 may operate, subsequent to configuring the hardware components in the computing system 202a/300 to provide the operating system and/or applications 306a (e.g., hypervisor applications and/or other applications) that perform the workload, to perform runtime compliance checks of the hardware compliance requirements and/or the software compliance requirements for the workload. For example, during runtime of the computing system 202a/300 (e.g., during the performance of the workload discussed above), the SCP workload compliance governor engine 404 in the SCP system 304/400 in the computing system 202a/300 may confirm that processing system/memory system (e.g., processing core/memory device) usage complies with the hardware compliance requirements of the workload, confirm that a workload image (e.g., a workload image version) is compliant, determine maximum latency requirements are being complied with, determine minimum throughput requirements are being complied with, determine that maximum throttling requirements are being complied with, determine workload telemetry requirements are being complied with, determine that firewall policies are being complied with, determine that storage key management policies are being complied with, determine that a new user account provided with the workload complies with user account requirements, and/or confirming any other compliance requirements that would be apparent to one of skill in the art in possession of the present disclosure.

Furthermore, at block 514, the SCP workload compliance governor engine 404 in the SCP system 304/400 in the computing system 202a/300 may operate, subsequent to configuring the hardware components in the computing system 202a/300 to provide the operating system and/or applications 306a that perform the workload, to perform a subsequent compliance check in response to a boot operation, a subsequent compliance check request, the detection of a second hardware component, and/or the detection of a second software component. For example, the hardware/software compliance requirements for the workload performed by the computing system 202a/300 may be confirmed by the SCP workload compliance governor engine 404 in the SCP system 304/400 in the computing system 202a/300 upon any power-on, reset, reboot, and/or other initialization of the computing system 202a/300. In another example, the hardware/software compliance requirements for the workload performed by the computing system 202a/300 may be confirmed by the SCP workload compliance governor engine 404 in the SCP system 304/400 in the computing system 202a/300 on demand and in response to a compliance request from a network administrator or other user (e.g., transmitted via the management system 206).

In another example, the SCP workload compliance governor engine 404 in the SCP system 304/400 in the computing system 202a/300 may detect the addition of a new hardware component to the computing system 202a/300 (e.g., the replacement of a storage device in the computing system 202a/300) and, in response, confirm the hardware/software compliance requirements for the workload performed by the computing system 202a/300 using that new hardware component. In another example, the SCP workload compliance governor engine 404 in the SCP system 304/400 in the computing system 202a/300 may detect the addition of a new software component to the computing system 202a/300 (e.g., a firmware update) and, in response, confirm the hardware/software compliance requirements for the workload performed by the computing system 202a/300 using that new software component. As such, subsequent to providing a workload on the computing system 202a/300 based on its workload requirements, the SCP workload compliance governor engine 404 in the SCP system 304/400 in the computing system 202a/300 may periodically perform compliance checks to ensure that those workload requirements continue to be satisfied.

In some embodiments, in response to detecting a workload compliance requirement "gap" (i.e., either an inability to satisfy a workload requirement for a workload, or a "drift" away from workload compliance requirement and towards not satisfying that workload component requirement), the SCP workload compliance governor engine 404 in the SCP system 304/400 in the computing system 202a/300 may operate to dynamically address compliance with that workload compliance requirement by, for example, communicating with the SCP manager in the management system 206 (e.g., similarly as discussed above with reference to blocks 504 and 506) to identify a new hardware component that addresses that workload compliance requirement gap, by unilaterally identifying a new hardware component that addresses that workload compliance requirement gap, identifying a new software component that addresses that workload compliance requirement gap, modifying an existing software component that addresses that workload compliance requirement gap, and/or performing any other workload compliance requirement gap remedying operations that would be apparent to one of skill in the art in possession of the present disclosure.

Thus, systems and methods have been described that provide distributed, immutable (i.e., unchangeable via the operating system), workload compliance governance that is local to each server device, thus ensuring workload compliance at the edge of networks, unified/consolidated workload compliance for all interfaces, and the ability to dynamically address workload compliance issues in real time. For example, the workload compliance governor system of the present disclosure may include an SCP manager coupled to a server device. An SCP subsystem in the server device receives a workload performance request associated with a workload, exchanges hardware compose communications with the SCP manager to compose hardware components for the workload, and receives back an identification of hardware components. The SCP subsystem then determines that the identified hardware components satisfy hardware compliance requirements for the workload, and configures the identified hardware components in the server device based on the software compliance requirements for the workload in order to cause those identified hardware components to provide an operating system and at least one application that operate to perform the workload. As such, the "separate" compliance conformance assessments required in conventional workload compliance systems to perform a workload are eliminated, making workload compliance assessments relatively quicker and less complicated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload compliance governor system, comprising:
a management system;
a computing system that is coupled to the management system via a network; and
a workload compliance governor subsystem that is included in the computing system and that is configured to:
receive a first workload performance request associated with a first workload including first compliance requirements;
exchange, with the management system, first compose communications to compose a plurality of components for performing the first workload;
receive, from the management system in response to the first compose communications, an identification of a plurality of first components for performing the first workload;
determine that the plurality of first components satisfy the first compliance requirements for the first workload; and
configure the plurality of first components in the computing system based on the first compliance requirements for the first workload in order to cause the plurality of first components in the computing system to begin performing the first workload.

2. The system of claim 1, wherein the workload compliance governor subsystem is configured to:
receive a second workload performance request associated with a second workload including second compliance requirements;
exchange, with the management system, second compose communications to compose a plurality of components for performing the second workload;
receive, from the management system in response to the second compose communications, an identification of a plurality of second components for performing the second workload;
determine that the plurality of second components do not satisfy the second compliance requirements for the second workload; and
transmit, to the management system, a non-compliance communication that indicates that the computing system cannot satisfy the second compliance requirements for the second workload.

3. The system of claim 1, wherein the first compliance requirements for the first workload include at least one of a processor system requirement, a memory system requirement, a storage system requirement, a Federal Information Processing Standard (FIPS) requirement, a Trusted Platform Module (TPM) requirement, a Secure Encrypted Drive (SED) requirement, or a latency requirement.

4. The system of claim 1, wherein the configuring the plurality of first components in the computing system based on the first compliance requirements include configuring at least one of firmware, Basic Input/Output System (BIOS) settings, or Baseboard Management Controller (BMC) settings.

5. The system of claim 1, wherein the configuring the plurality of first components in the computing system based on the first compliance requirements for the first workload include configuring at least one of a secure boot process, a Trusted Platform Module (TPM), an active directory, or a Federal Information Processing Standard (FIPS) mode.

6. The system of claim 1, wherein the workload compliance governor subsystem is configured, subsequent to configuring the plurality of first components in the computing system to provide an operating system and at least one application that operate to perform the first workload, to:
perform a runtime compliance check of the first compliance requirements for the first workload.

7. An Information Handling System (IHS), comprising:
a processing system; and
a memory system that is coupled to the processing system and that includes instructions that, when executed by the processing system, cause the processing system to provide a workload compliance governor engine that is configured to:
receive a first workload performance request associated with a first workload including first compliance requirements;
exchange, with a management system, first compose communications to compose a plurality of components for performing the first workload;
receive, from the management system in response to the first compose communications, an identification of a plurality of first components for performing the first workload;
determine that the plurality of first components satisfy the first compliance requirements for the first workload; and
configure the plurality of first components based on the first compliance requirements for the first workload in order to cause the plurality of first components to begin performing the first workload.

8. The IHS of claim 7, wherein the workload compliance governor engine is configured to:
receive a second workload performance request associated with a second workload including second compliance requirements;
exchange, with the management system, second compose communications to compose a plurality of components for performing the second workload;
receive, from the management system in response to the second compose communications, an identification of a plurality of second components for performing the second workload;
determine that the plurality of second components do not satisfy the second compliance requirements for the second workload; and
transmit, to the management system, a non-compliance communication that indicates that the second compliance requirements cannot be satisfied for the second workload.

9. The IHS of claim 7, wherein the first compliance requirements for the first workload include at least one of a processor system requirement, a memory system requirement, a storage system requirement, a Federal Information Processing Standard (FIPS) requirement, a Trusted Platform Module (TPM) requirement, a Secure Encrypted Drive (SED) requirement, or a latency requirement.

10. The IHS of claim 7, wherein the configuring the plurality of first components based on the first software compliance requirements include configuring at least one of firmware, Basic Input/Output System (BIOS) settings, or Baseboard Management Controller (BMC) settings.

11. The IHS of claim 7, wherein the configuring the plurality of first components based on the first compliance requirements for the first workload include configuring at least one of a secure boot process, a Trusted Platform Module (TPM), an active directory, or a Federal Information Processing Standard (FIPS) mode.

12. The IHS of claim 7, wherein the workload compliance governor engine is configured, subsequent to configuring the plurality of first components to provide an operating system and at least one application that operate to perform the first workload, to:
perform a runtime compliance check of the first compliance requirements for the first workload.

13. The IHS of claim 7, wherein the workload compliance governor engine is configured, subsequent to configuring the plurality of first components to provide an operating system and at least one application that operate to perform the first workload, to perform a subsequent compliance check in response to at least one of:
a boot operation, a subsequent compliance check request, or the detection of a second component.

14. A method for governing workload compliance in a computing system, comprising:
receiving, by a workload compliance governor subsystem, a first workload performance request associated with a first workload including first compliance requirements;
exchanging, by the workload compliance governor subsystem with a management system, first compose communications to compose a plurality of components for performing the first workload;
receiving, by the workload compliance governor subsystem from the management system in response to the first compose communications, an identification of a plurality of first components for performing the first workload;
determining, by the workload compliance governor subsystem, that the plurality of first components satisfy the first compliance requirements for the first workload; and
configuring, by the workload compliance governor subsystem, the plurality of first components based on the first compliance requirements for the first workload in order to cause the plurality of first components to begin performing the first workload.

15. The method of claim 14, further comprising:
receiving, by the workload compliance governor subsystem, a second workload performance request associated with a second workload including second compliance requirements;
exchanging, by the workload compliance governor subsystem, with the management system, second compose communications to compose a plurality of components for performing the second workload;
receiving, by the workload compliance governor subsystem, from the management system in response to the second compose communications, an identification of a plurality of second components for performing the second workload;
determining, by the workload compliance governor subsystem, that the plurality of second components do not satisfy the second compliance requirements for the second workload; and
transmitting, by the workload compliance governor subsystem, to the management system, a non-compliance communication that indicates that the second compliance requirements cannot be satisfied for the second workload.

16. The method of claim 14, wherein the first compliance requirements for the first workload include at least one of a processor system requirement, a memory system requirement, a storage system requirement, a Federal Information Processing Standard (FIPS) requirement, a Trusted Platform Module (TPM) requirement, a Secure Encrypted Drive (SED) requirement, or a latency requirement.

17. The method of claim 14, wherein the configuring the plurality of first components based on the first compliance requirements include configuring at least one of firmware, Basic Input/Output System (BIOS) settings, or Baseboard Management Controller (B MC) settings.

18. The method of claim 14, wherein the configuring the plurality of first components based on the first compliance requirements for the first workload include configuring at least one of a secure boot process, a Trusted Platform Module (TPM), an active directory, or a Federal Information Processing Standard (FIPS) mode.

19. The method of claim 14, further comprising:
performing, by the workload compliance governor subsystem subsequent to configuring the plurality of first components to provide an operating system and at least one application that operate to perform the first workload, a runtime compliance check of the first compliance requirements for the first workload.

20. The method of claim 14, further comprising:
performing, by the workload compliance governor subsystem subsequent to configuring the plurality of first components to provide an operating system and at least one application that operate to perform the first workload, a subsequent compliance check in response to at least one of:
a boot operation, a subsequent compliance check request, or the detection of a second component.

* * * * *